US009440542B2

(12) United States Patent
Inaba et al.

(10) Patent No.: US 9,440,542 B2
(45) Date of Patent: Sep. 13, 2016

(54) REACTOR, CONVERTER, AND POWER CONVERSION DEVICE

(71) Applicants: SUMITOMO ELECTRIC INDUSTRIES, LTD., Osaka-shi, Osaka (JP); SUMITOMO WIRING SYSTEMS, LTD., Yokkaichi-shi, Mie (JP); AUTONETWORKS TECHNOLOGIES, LTD., Yokkaichi-shi, Mie (JP)

(72) Inventors: Kazuhiro Inaba, Osaka (JP); Shinichiro Yamamoto, Osaka (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 0 days.

(21) Appl. No.: 14/760,383

(22) PCT Filed: Jan. 20, 2014

(86) PCT No.: PCT/JP2014/050906
§ 371 (c)(1),
(2) Date: Jul. 10, 2015

(87) PCT Pub. No.: WO2014/115667
PCT Pub. Date: Jul. 31, 2014

(65) Prior Publication Data
US 2015/0352965 A1    Dec. 10, 2015

(30) Foreign Application Priority Data

Jan. 28, 2013    (JP) ................................. 2013-013367

(51) Int. Cl.
| H01F 27/00 | (2006.01) |
| B60L 11/18 | (2006.01) |
| H02M 7/537 | (2006.01) |
| H01F 27/255 | (2006.01) |

(Continued)

(52) U.S. Cl.
CPC ............. *B60L 11/1803* (2013.01); *H01F 3/08* (2013.01); *H01F 27/00* (2013.01); *H01F 27/02* (2013.01);
(Continued)

(58) Field of Classification Search
CPC ....................... H01F 5/00; H01F 27/00–27/30
USPC ................ 336/65, 83, 90–96, 200, 210–212, 336/230–233
See application file for complete search history.

(56) References Cited

U.S. PATENT DOCUMENTS

| 2011/0156853 A1 | 6/2011 | Kato et al. |
| 2012/0313740 A1 | 12/2012 | Inaba et al. |

(Continued)

FOREIGN PATENT DOCUMENTS

| JP | H07-142265 A | 6/1995 |
| JP | 2009-033055 A | 2/2009 |

(Continued)

OTHER PUBLICATIONS

Feb. 10, 2014 International Search Report issued in International Patent Application No. PCT/JP2014/050906.

*Primary Examiner* — Tuyen Nguyen
(74) *Attorney, Agent, or Firm* — Oliff PLC

(57) ABSTRACT

A reactor includes a coil formed by connecting a pair of coil elements configured by a wound wire, and magnetic core. The reactor for an on-vehicle converter converts an input voltage. Electricity applying conditions include a maximum DC current of 100 A or higher and 1000 A or lower, an average voltage of 100 V or higher and 1000 V or smaller, and a usable frequency of 5 kHz or higher and 100 kHz or smaller. The magnetic core is obtained by combining a plurality of divided core pieces without a gap provided. All the divided core pieces are made of hardened compact obtained by hardening resin of composite material containing magnetic powder and the resin. A distance between an inner peripheral surface of the coil element and an outer peripheral surface of the magnetic core opposite to the inner peripheral surface is 0.1 mm or more and 2 mm or less.

6 Claims, 4 Drawing Sheets

(51) Int. Cl.
*H01F 27/28* (2006.01)
*H01F 27/32* (2006.01)
*H01F 27/02* (2006.01)
*H01F 27/06* (2006.01)
*H01F 37/00* (2006.01)
*H01F 3/08* (2006.01)
*H02M 3/155* (2006.01)

(52) U.S. Cl.
CPC ............ *H01F 27/06* (2013.01); *H01F 27/255* (2013.01); *H01F 27/2823* (2013.01); *H01F 27/324* (2013.01); *H01F 37/00* (2013.01); *H02M 7/537* (2013.01); *H02M 3/155* (2013.01)

(56) References Cited

U.S. PATENT DOCUMENTS

2014/0232508 A1* 8/2014 Inaba ...................... H01F 37/00
  336/233
2014/0293655 A1* 10/2014 Inaba .................... H01F 27/255
  363/15

FOREIGN PATENT DOCUMENTS

JP    2009-218293 A    9/2009
JP    2011-199257 A    10/2011
WO    2010/021113 A1   2/2010

* cited by examiner

US 9,440,542 B2

REACTOR, CONVERTER, AND POWER CONVERSION DEVICE

TECHNICAL FIELD

The present invention relates to a reactor that is used for, for example, a component of a power conversion device such as an on-vehicle direct current to direct current (DC-DC) converter mounted on a vehicle such as a hybrid electric vehicle. The invention also relates to a converter including the reactor, and a power conversion device including the converter. The present invention more particularly relates to a reactor having a small distance between a coil and a magnetic core and capable of reducing a size.

BACKGROUND ART

A reactor is one of parts in a circuit that performs a step-up operation and a step-down operation of a voltage. The reactor is used for a converter mounted on a vehicle such as a hybrid electric vehicle. For example, the reactor is disclosed in Patent Literature 1.

The reactor disclosed in Patent Literature 1 includes a coil having a pair of coil elements, and a ring-shaped core for a reactor (a magnetic core) including a pair of coil arranging portions covered with these coil elements and a pair of exposed portions which is not covered with the coil elements. The coil arranging portion is made of a powder compact, a hardened compact obtained by hardening a resin of a mixture (a composite material) of magnetic powder and a resin having fluidity or the like. The exposed portion is made of a powder compact.

CITATION LIST

Patent Literature

Patent Literature 1: Japanese Unexamined Patent Publication No. 2009-33055

SUMMARY OF INVENTION

Technical Problem

A reactor mounted on a hybrid electric vehicle is desired to be further decreased in a size in order to reduce an installation space. In particular, the reactor has a high volume occupying an inner part of a converter. For this reason, further reduction in the size is desired.

In consideration of the circumstances, an object of the present invention is to provide a reactor having a smaller distance between a coil and a magnetic core as compared with the conventional reactor and capable of reducing a size.

Another object of the present invention is to provide a converter including the reactor, and a power conversion device including the converter.

Solution to Problem

The present invention relates to a reactor including a coil formed by connecting a pair of coil elements configured by a wound wire, and a magnetic core. The reactor is used for an on-vehicle converter that converts an input voltage. Electricity applying conditions include a maximum DC current of 100 A or higher and 1000 A or lower, an average voltage of 100 V or higher and 1000 V or lower, and a usable frequency of 5 kHz or higher and 100 kHz or lower. The magnetic core is obtained by combining a plurality of divided core pieces without a gap provided therebetween. All of the divided core pieces are made of a hardened compact obtained by hardening a resin of a composite material containing magnetic powder and the resin. A distance between an inner peripheral surface of the coil element and an outer peripheral surface of the magnetic core which is opposite to the inner peripheral surface is 0.1 mm or more and 2 mm or less.

Advantageous Effects of Invention

The reactor according to the present invention can have a size reduced.

The converter and the power conversion device according to the present invention can have a size reduced and can be suitably used for on-vehicle parts and the like.

DESCRIPTION OF EMBODIMENTS

Summary of Embodiments of Invention

Figure 1:
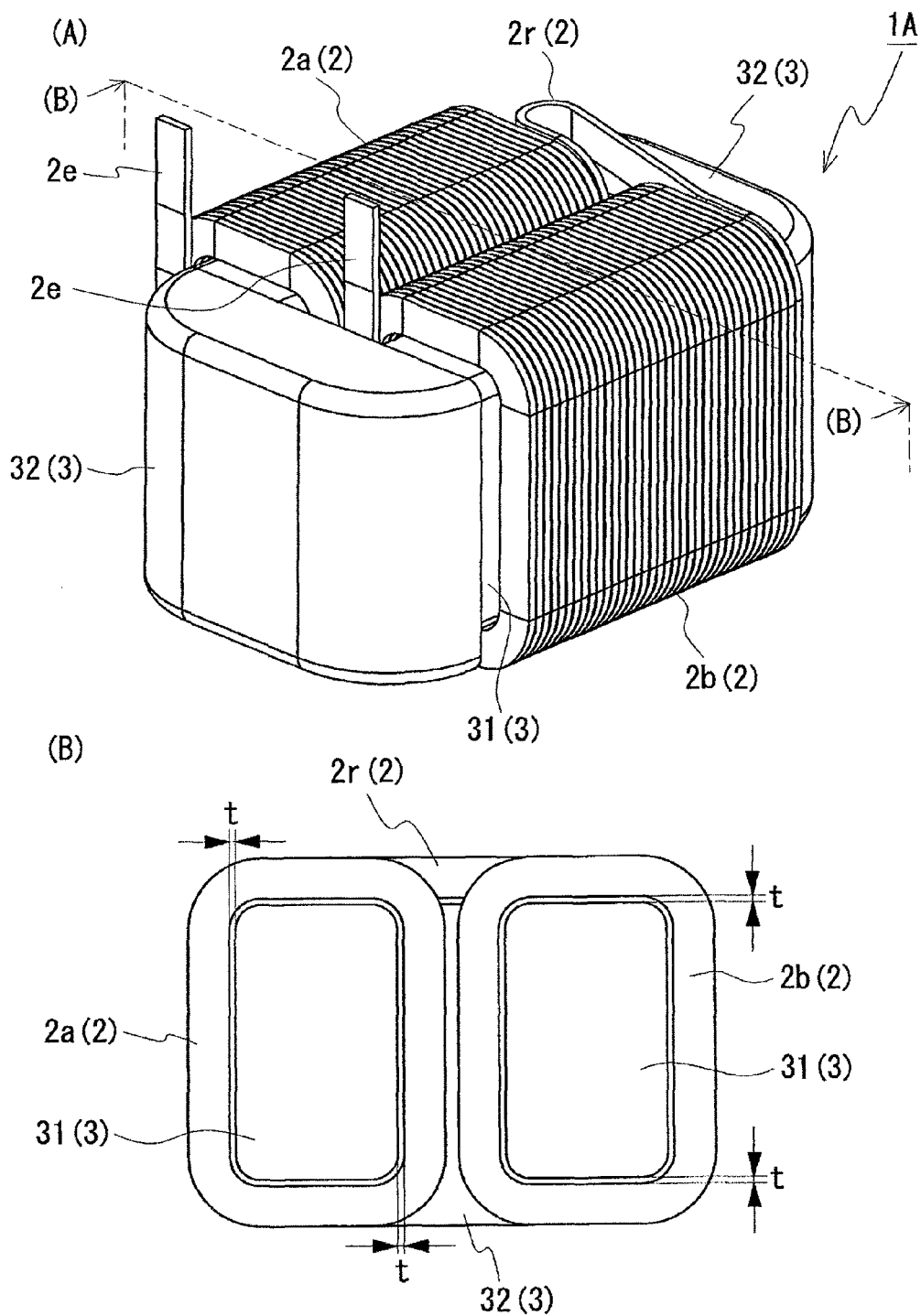
FIG. 1(A) is a brief perspective view showing a reactor according to a first embodiment.
FIG. 1(B) is a (B)-(B) sectional view in FIG. 1(A).

Summary of embodiments of the present invention will be described below.

A reactor according to the embodiments of the present invention includes a coil formed by connecting a pair of coil elements configured by a wound wire, and a magnetic core. The reactor is used for an on-vehicle converter that converts an input voltage (for example, a step-up operation or a step-down operation of the input voltage). Electricity application conditions include a maximum direct current of 100 A or higher and 1000 A or lower, an average voltage of 100 V or higher and 1000 V or lower, and a usable frequency of 5 kHz or higher and 100 kHz or lower. The magnetic core is obtained by combining a plurality of divided core pieces without a gap provided therebetween. All of the divided core pieces are made of a hardened compact obtained by hardening a resin of a composite material containing magnetic powder and the resin. A distance between an inner peripheral surface of the coil element and an outer peripheral surface of the magnetic core which is opposite to the inner peripheral surface is 0.1 mm or more and 2 mm or less.

With this configuration, the distance between the inner peripheral surface of the coil element and the outer peripheral surface of the magnetic core is small. Therefore, a height or a width of the reactor can be reduced. In a case in which a magnetic core having the same size as that in the conventional art is used, it is possible to reduce the size of the reactor. Since all of the divided core pieces are made of the hardened compact, it is possible to combine the divided core pieces without a gap provided therebetween. In other words, a leakage flux is not substantially caused by the gap. Even if the coil and the magnetic core are disposed close to each other, a loss is prevented from being caused by entrance of the leakage flux into the coil. For this reason, a reactor 1A can be suitably used for the on-vehicle converter that converts an input voltage. A large volume of the reactor occupies an inner part of the on-vehicle converter. By using a small-sized reactor, therefore, it is possible to reduce the size of the on-vehicle converter itself.

As an aspect of the present embodiment, the reactor includes an insulating member for insulating the distance between the inner peripheral surface of the coil element and the outer peripheral surface of the magnetic core which is opposite to the inner peripheral surface.

With this configuration, it is possible to ensure insulation between the coil and the magnetic core.

A converter according to the present embodiment includes the reactor according to the present embodiment descried above. The converter includes a switching element, a driving circuit for controlling an operation of the switching element, and the reactor for making a switching operation smooth, the converter converting an input voltage by the operation of the switching element.

A power conversion device according to the present embodiment includes the converter according to the present embodiment described above. The power conversion device includes a converter for converting an input voltage and an inverter connected to the converter, for mutually converting a direct current and an alternating current, the power conversion device driving a load with power obtained with the conversion through the inverter.

The converter according to the present embodiment and the power conversion device according to the present embodiment can have sizes reduced and can be suitably used for on-vehicle parts or the like.

Details of Embodiments of the Invention

The details of embodiments according to the present invention will be described below with reference to the drawings. In the drawings, the same reference numerals denote objects having the same names.

First Embodiment

Reactor

A reactor 1A according to a first embodiment will be described with reference to FIGS. 1(A), 1(B), and 2. The reactor 1A includes a coil 2 having a pair of coil elements 2a and 2b, and a magnetic core 3 to be combined with the coil 2. The reactor 1A mainly features that there is a small distance between inner peripheral surfaces of the coil elements 2a and 2b and an outer peripheral surface of the magnetic core 3 which is opposite to the inner peripheral surfaces. First, a structure related to the main feature portion of the reactor 1A and a main effect will be described in order, and respective structures including the other feature portions will be then explained in detail. A lateral arrangement direction of the coil elements 2a and 2b (a transverse direction in paper face) is set to be a width of the reactor 1A and an orthogonal direction to both a width direction and axial directions of the coil elements 2a and 2b (a vertical direction in the paper face) is set to be a height of the reactor 1A.

[Structure Related to Main Feature Portion]
(Coil)

The coil 2 includes a pair of coil elements 2a and 2b and a coil element coupling portion 2r that couples both the coil elements 2a and 2b. The coil elements 2a and 2b are formed into a hollow cylindrical shape with the same number of coil turns in the same winding direction, and are arranged side by side such that the axial directions thereof are parallel to each other. Moreover, the coil element coupling portion 2r is bent in a U-like shape coupling both of the coil elements 2a and 2b at the other end side of the coil 2 (at a right side in the paper face of FIG. 1(A)). The coil 2 may be formed by spirally winding a single wire without a junction portion or may be formed by fabricating the respective coil elements 2a and 2b through separate wires and bonding ends of the wires of the coil elements 2a and 2b through solder, contact bonding or the like.

The coil 2 preferably uses a coated wire having an insulating coating made of an insulating material on an outer periphery of a conductor such as a rectangular wire, a circular wire or the like which is made of a conductive material such as copper, aluminum or an alloy thereof. In the present embodiment, the conductor is made of a copper rectangular wire and the insulating coating uses a coated rectangular wire made of enamel (typically, polyamideimide). Each of the coil elements 2a and 2b is an edgewise coil formed by winding the coated rectangular wire edgewise. Although each of the coil elements 2a and 2b takes an end surface shape obtained by rounding a corner portion of a rectangle (FIG. 1(B)), moreover, the end surface shape can be properly changed into a circular shape or the like.

Both ends 2e and 2e of the coil 2 are extended from turn forming portions and connected to a terminal member which is not shown. An external device (not shown) such as a power supply that supplies electric power to the coil 2 is connected through the terminal member.

(Magnetic Core)

The magnetic core 3 is configured in combination without a gap provided between the divided core pieces. Herein, "without a gap provided" includes, of course, the case in which the gap is not present between the divided core pieces, and the case in which a clearance is inevitably present and the case in which an adhesive is used to couple the divided core pieces. The reason is that the clearance or the adhesive does not substantially influence a relative magnetic permeability of the whole magnetic core or an inductance of the reactor. The substantial non-influence indicates the case in which a change in the relative magnetic permeability of the whole magnetic core is 5% or lower with respect to non-presence of the clearance or the adhesive even if the clearance or the adhesive is present.

Figure 2:
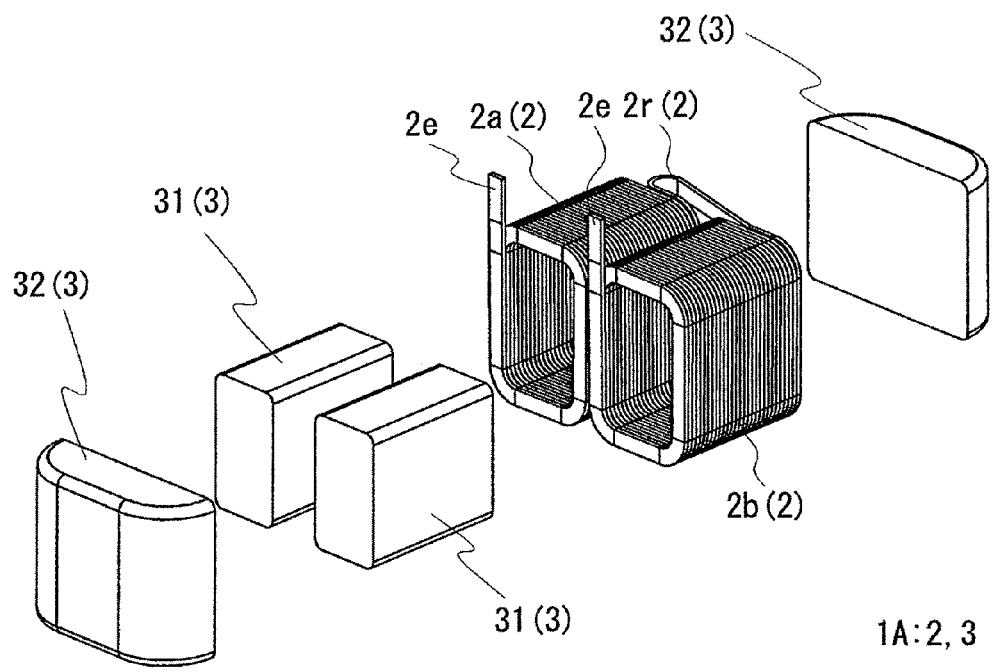
FIG. 2 is an exploded perspective view showing the reactor according to the first embodiment.

More specifically, the magnetic core 3 includes divided core pieces 31 and 31 disposed on an inside of the coil elements 2a and 2b and divided core pieces 32 and 32 exposed from the coil elements 2a and 2b as shown in FIG. 2. In the present embodiment, since the divided core piece 31 is disposed on the inside of the coil elements 2a and 2b (that is, an inside of the coil 2), it is referred to as an inner core. The definition of the inner core will be described below. Since the divided core piece 32 is exposed from the coil elements 2a and 2b (the coil 2), it is referred to as an outer core. The inner cores 31 and 31 and the outer cores 32 and 32 are combined like a ring by bonding four places, that is, an inner end surface of one of the outer cores 32 (a surface where the outer cores 32 are opposite to each other) and one of end surfaces of the pair of inner cores 31 and 31, and an inner end surface of the other outer core 32 and the other end surface of the pair of inner cores 31 and 31. The inner cores 31 and 31 and the outer cores 32 and 32 form a closed magnetic circuit when the coil 2 is energized.

The inner cores 31 and 31 are columnar members having outer shapes conforming to inner peripheral shapes of the respective coil elements 2a and 2b (herein, shapes obtained by rounding corner portions of a rectangular parallelepiped (FIG. 1(B))), and the outer cores 32 and 32 are columnar members having almost dome-shaped upper and lower surfaces, respectively. All of the inner cores 31 and 31 and the outer cores 32 and 32 are made of a hardened compact obtained by hardening a resin of a composite material having magnetic powder mixed in a resin serving as a binder.

(Distance Between Coil and Magnetic Core)

A distance t between the inner peripheral surfaces of the coil elements 2a and 2b and the outer peripheral surfaces of the inner cores 31 and 31 is reduced over a whole periphery of the inner peripheral surfaces of the coil elements 2a and 2b (the outer peripheral surfaces of the inner cores 31 and 31). The magnetic core 3 combines the respective cores 31, 31, 32 and 32 made of the hardened compact without a gap provided therebetween. Therefore, the distance t can be reduced. A leakage flux is not substantially caused by the gap. Even if the coil 2 and the magnetic core 3 are disposed close to each other, therefore, a loss is prevented from being caused by the entrance of the leakage flux into the coil 2. As the distance t is reduced more, the size of the reactor 1A can be decreased more. The small distance t over the whole periphery implies reduction in all of a distance t between upper surfaces of the inner cores 31 and 31 and the inner peripheral surfaces of the coil elements 2a and 2b which are opposite to the upper surfaces, a distance t between lower surfaces of the inner cores 31 and 31 and the inner peripheral surfaces of the coil elements 2a and 2b which are opposite to the lower surfaces, a distance t between both side surfaces of the inner cores 31 and 31 and the inner peripheral surfaces of the coil elements 2a and 2b which are opposite to the both side surfaces respectively, and a distance between a curved surface forming all corner portions coupling each of the upper and lower surfaces of the inner cores 31 and 31 to each of the both side surfaces and the inner peripheral surfaces of the coil elements 2a and 2b which are opposite to the curved surface. Herein, the distance between the curved surface and the inner peripheral surfaces of the coil elements 2a and 2b which are opposite to the curved surface represents a length in a normal direction of the curved surface.

More specifically, the distance t is 0.1 mm or more and 2 mm or less. By setting the distance t to 2 mm or less, it is possible to reduce both the height and the width of the reactor 1A, thereby decreasing the size of the reactor 1A. By setting the distance t to 0.1 mm or more, an insulating member which will be described below can easily be provided between the inner peripheral surfaces of the coil elements 2a and 2b and the inner cores 31 and 31. It is particularly preferable that the distance t should be 0.2 mm or more and 1 mm or less. Within this range, it is preferable that the distance t should be uniform over the whole periphery. Herein, the distance t is set to be 1.0 mm over the whole periphery. In other words, the distance t is uniform over the whole periphery.

[Function and Effect in Main Feature Portion of Reactor]

According to the reactor 1A having the structure described above, there is the small distance t between the inner peripheral surfaces of the coil elements 2a and 2b and the outer peripheral surfaces of the inner cores 31 and 31 (the magnetic core 3) which are opposite to the inner peripheral surfaces. Therefore, it is possible to reduce the height or the width, thereby decreasing the size. For this reason, the reactor 1A can suitably be used in an on-vehicle converter for converting an input voltage. A large volume of the reactor occupies an inner part of the on-vehicle converter; however, by using a small-sized reactor, it is possible to reduce the size of the on-vehicle converter itself. Moreover, the magnetic core 3 is configured in combination without a gap provided between the respective cores 31, 31, 32 and 32. For this reason, a noise is not substantially caused by the gap.

[Explanation of Each Structure Including Other Feature Portion]

(Magnetic Core)

As described above, the inner cores 31 and 31 are disposed on the inside of the coil elements 2a and 2b (the coil 2). The "inner core disposed on the inside of the coil" implies an inner core having at least a part disposed in the coil. For example, "the inner core disposed on the inside of the coil" includes the case in which a central part of the inner core is disposed in an inner part of the coil and the vicinity of an end of the inner core is positioned on an outside of the coil. Herein, lengths of the inner cores 31 and 31 in the axial direction are greater than lengths of the coil elements 2a and 2b in the axial direction (FIG. 1(A)). In other words, the end surface of the inner core 31 and the vicinity thereof are exposed with protrusion from the end surfaces of the coil elements 2a and 2b.

The upper surface of the inner core 31 and the upper surface of the outer core 32 are flush with each other (FIGS. 1(A) and (B)). On the other hand, the lower surface of the inner core 31 is not flush with the lower surface of the outer core 32 but the lower surface of the outer core 32 is protruded downward than the lower surface of the inner core 31 and is flush with the lower surface of the coil 2 (FIG. 1(B)). Accordingly, an installation target side surface of the reactor 1A is configured by the lower surfaces of the both coil elements 2a and 2b and the lower surfaces of the both outer cores 32. The reactor 1A is usually attached to an installation target such as a cooling base. For this reason, the outer cores 32 and 32 as well as the coil 2 configure surfaces on an installation target side, resulting in excellent heat-release performance.

All of the inner cores 31 and 31 and the outer cores 32 and 32 are made of a hardened compact obtained by hardening a resin of a composite material acquired through mixture of magnetic powder in a resin serving as a binder as described above. For magnetic powder, it is possible to utilize soft magnetic materials, for example, iron, an iron base alloy, an alloy containing a rare-earth element, ferrite and the like, coating powder including an insulating coating in these soft magnetic materials, and the like. By using the coating powder, particularly, it is possible to effectively reduce an eddy current loss in the hardened compact. The insulating coating includes a phosphate compound, a silicon compound, a zirconium compound, an aluminum compound, a boron compound and the like, for example. On the other hand, for the resin serving as the binder, it is possible to use a thermosetting resin such as an epoxy resin, a phenol resin, a silicone resin or a urethane resin. In addition, it is also possible to use a thermoplastic resin such as a polyphenylene sulfide (PPS) resin, a polyimide resin, a fluororesin, a polyamide resin, a room temperature curing resin, or a low temperature curing resin. Moreover, it is also possible to use BMC (Bulk molding compound) obtained by mixing calcium carbide or glass fiber in unsaturated polyester, millable type silicone rubber, millable type urethane rubber or the like.

An average particle size of the magnetic powder is preferably 1 µm or more and 1000 µm or less, and particularly 10 µm or more and 500 µm or less. Moreover, the magnetic powder may be obtained by mixing plural types of powder having different particle sizes. By using, for a material, magnetic powder having an average particle size satisfying the range, it is possible to increase fluidity and manufacture a hardened compact with high productivity by utilizing injection molding or the like.

It is preferable that a content of the magnetic powder occupying the hardened compact should be 20% by volume or higher and 75% by volume or lower when the hardened compact is set to be 100% by volume. When the content of the magnetic powder is 20% by volume or higher, it is possible to easily ensure a magnetic characteristic such as a relative magnetic permeability or a saturation magnetic flux density. When the content of the magnetic powder is 75% by volume or lower, it can easily be mixed with a resin so that productivity of the hardened compact is high. It is further preferable that the content of the magnetic powder should be 40% by volume or higher and be 65% by volume or lower. If the magnetic powder is a material such as iron or an Fe—Si alloy, particularly, it is possible to easily set the saturation magnetic flux density to be 0.8 T or more by setting the content of the magnetic powder to be 40% by volume or more. When the content of the magnetic powder is set to be 65% by volume or lower, the magnetic powder and the resin can be mixed more easily so that the productivity is higher.

The hardened compact may contain powder (filler) made of a non-magnetic material such as ceramics, for example, alumina, silica or the like in addition to the magnetic powder and the resin. The filler contributes to enhancement in heat-release performance and suppression of uneven distribution of the magnetic powder (ununiform dispersion). Moreover, the filler is a particulate and is provided between magnetic particles. Consequently, it is possible to prevent reduction in a rate of the magnetic powder due to filler content. When the hardened compact is set to be 100% by mass, the content of the filler is preferably 0.2% by mass or more and 20% by mass or less, further preferably 0.3% by mass or more and 15% by mass or less, and particularly preferably 0.5% by mass or more and 10% by mass or less.

The relative magnetic permeability of each of the inner cores 31 and 31 is preferably 5 or more and 50 or less, further preferably 5 or more and 35 or less, and particularly preferably 10 or more and 35 or less. The saturation magnetic flux density of each of the inner cores 31 and 31 is preferably 0.6 T or more, further preferably 0.8 T or more, and particularly preferably 1.0 T or more. Moreover, a thermal conductivity of each of the inner cores 31 and 31 is preferably 0.25 W/m·K or more. On the other hand, the relative magnetic permeability of each of the outer cores 32 and 32 is preferably 5 or more and 50 or less, further preferably 5 or more and 35 or less, and particularly preferably 10 or more and 35 or less. If the relative magnetic permeability of each of the outer cores 32 and 32 (the inner cores 31 and 31) is set to be higher (lower) than the relative magnetic permeability of each of the inner cores 31 and 31 (the outer cores 32 and 32), a leakage flux can be reduced further easily. The saturation magnetic flux density of each of the outer cores 32 and 32 is preferably 0.6 T or more, further preferably 0.8 T or more, and particularly preferably 1.0 T or more. The relative magnetic permeability of the whole magnetic core 3 is preferably 5 or more and 50 or less, and particularly preferably 10 or more and 35 or less. The conventional powder compact has a higher content of the magnetic powder as compared with the hardened compact and—often has a relative magnetic permeability of approximately several hundreds which is higher than the relative magnetic permeability of the hardened compact. For this reason, in the case in which a core formed by the powder compact is provided, it is hard to prevent the magnetic saturation without a gap provided. On the other hand, in the present embodiment, each of the inner cores 31 and 31 and the outer cores 32 and 32 has a low relative magnetic permeability and the whole magnetic core 3 also has a low relative magnetic permeability. Therefore, it is possible to prevent the magnetic saturation without a gap provided. For this reason, the respective cores 31, 31, 32 and 32 can be combined without a gap provided therebetween.

The relative magnetic permeability or the saturation magnetic flux density of the hardened compact can be regulated by a variation in the content of the magnetic powder or a change in a material of the magnetic powder. If the content of the magnetic powder in the hardened compact is increased, the relative magnetic permeability or the saturation magnetic flux density can be raised. By using magnetic powder having a high relative magnetic permeability, it is possible to increase the relative magnetic permeability of the hardened compact. By using magnetic powder having a high saturation magnetic flux density, it is possible to increase the saturation magnetic flux density of the hardened compact.

It is assumed that the relative magnetic permeability of each of the cores is obtained in the following manner. A ring-shaped test piece having an outside diameter of 34 mm, an inside diameter of 20 mm and a thickness of 5 mm is fabricated by a hardened compact formed by the same material as each core. A wire having primary 300 turns and secondary 20 turns is given to the test piece to measure a B-H initial magnetization curve of the test piece within a range of H=0 to 100 oersteds (Oe). For the measurement, for example, it is possible to use BH Curve Tracer "BHS-40S10K" manufactured by Riken Denshi Co., Ltd. A maximum value of a gradient (B/H) of a B-H initial magnetization curve thus obtained is found and is set to be the relative magnetic permeability of each core. Usually, the gradient (B/H) of the B-H initial magnetization curve is a maximum with H=0 or in the vicinity of H=0. The magnetization curve is a DC magnetization curve. Moreover, the relative magnetic permeability is a so-called DC magnetic permeability and is different from an AC relative magnetic permeability measured in an alternating magnetic field. On the other hand, the saturation magnetic flux density of each core is set to be a magnetic flux density when a magnetic field of 10000 (Oe) is applied to the test piece by an electromagnet and is magnetically saturated sufficiently.

In order to form the hardened compact, typically, it is possible to utilize injection molding, transfer molding, MIM (Metal Injection Molding), cast molding, press molding using magnetic powder and a powdered hard resin, or the like. In the case of the injection molding, a predetermined pressure is applied to a mixed material of the magnetic powder and the resin and the mixed material is filled in a molding die and is thus molded. By hardening the resin, then, it is possible to obtain a hardened compact. In the case of the transfer molding or the MIM, similarly, the mixed material is filled in the molding die and is thus molded. In the case of the cast molding, the mixed material is filled in the molding die and is thus molded and hardened without application of a pressure. Thus, the hardened compact can be obtained.

(Insulating Member)

It is preferable that the reactor 1A according to the present embodiment should take a configuration including an insulating member for insulating the coil 2 from the magnetic core 3. As a matter of course, consequently, the insulation between the coil 2 and the magnetic core 3 is ensured. In addition, the coil 2 and the magnetic core 3 can easily be positioned. More specifically, an insulation tape is stuck to the inner peripheral surfaces of the coil elements 2a and 2b or the outer peripheral surfaces of the inner cores 31 and 31, insulation coating is applied thereto or the inner peripheral surfaces of the coil elements 2a and 2b or the outer peripheral surfaces of the inner cores 31 and 31 are covered with an insulating paper or an insulating sheet.

Alternatively, a cylindrical bobbin (not shown) may be disposed on the outer periphery of the inner cores 31 and 31. A material for constituting the cylindrical bobbin includes a thermoplastic resin such as a PPS resin, a polytetrafluoroethylene (PTFE) resin, a liquid crystal polymer (LCP), nylon 6, nylon 66 or a polybutylene terephthalate (PBT) resin. For example, the cylindrical bobbin constituted by a pair of sectional-shaped divided pieces can easily be disposed on the outer periphery of the inner cores 31 and 31. In addition to the cylindrical bobbin, a frame-shaped bobbin (not shown) may be disposed between the end surfaces of the coil elements 2a and 2b and the outer cores 32 and 32. Consequently, insulation between the coil 2 and the outer core 32 can also be ensured. In the case in which the frame-shaped bobbin is provided, it is a B-shaped plate member having a pair of opening portions (through holes) in which the inner cores 31 and 31 can be inserted respectively. A material for constituting the frame-shaped bobbin includes the same resin as the cylindrical bobbin.

Alternatively, it is also possible to use a coil compact obtained by coating the outer peripheral surface and the inner peripheral surface of the coil 2 and the end surface with an insulating resin. By adjusting a thickness of the resin coating the inner peripheral surface of the coil 2, it is also possible to utilize the resin in order to position the inner cores 31 and 31. It is also possible to use a coil compact obtained by integrally molding the coil 2 and the inner cores 31 and 31 with the insulating resin. The insulating resin also has a function for holding the shape of the coil 2 or maintaining the coil 2 in a compression state instead of a natural length thereof. Referring to the coil compact, thus, the coil 2 can easily be handled and a length in an axial direction of the coil 2 can be reduced. A thickness of the resin in the coil compact is set to 0.1 mm or more and 2 mm or less. In order to manufacture the coil compact, it is possible to utilize the manufacturing method described in Japanese Unexamined Patent Publication No. 2009-218293, for example. The molding includes injection molding, transfer molding and cast molding. For the insulating resin, it is possible to suitably utilize a thermosetting resin such as an epoxy resin or a thermoplastic resin such as a PPS resin or LCP. By utilizing, for the insulating resin, a resin mixed with a filler made of at least one of ceramics selected from silicon nitride, alumina, aluminum nitride, boron nitride and silicon carbide, it is possible to enhance heat-release performance.

(Purpose of Use)

The reactor 1A can be suitably used for a purpose of use under electricity application conditions in which a maximum current (direct current) is in a range from about 100 A to 1000 A, an average voltage is in a range from about 100V to 1000 V, and a usable frequency is in a range from about 5 kHz to 100 kHz, for example, or typically, a component of a converter mounted on a vehicle such as an electric vehicle, a hybrid electric vehicle, etc. and serving to convert an input voltage or a component of an on-vehicle power conversion device including the converter.

According to the reactor 1A described above, in addition to the effect, it is possible to ensure insulation between both the coil 2 and the magnetic core 3 by providing an insulating member therebetween. Furthermore, it is possible to enhance reliability for positioning the coil 2 and the magnetic core 3. Therefore, it is possible to easily make the distance t between the inner peripheral surfaces of the coil elements 2a and 2b and the outer peripheral surfaces of the inner cores 31 and 31 uniform over the whole periphery of the inner peripheral surfaces of the coil elements 2a and 2b (the outer peripheral surfaces of the inner cores 31 and 31).

Second Embodiment

Figure 3:
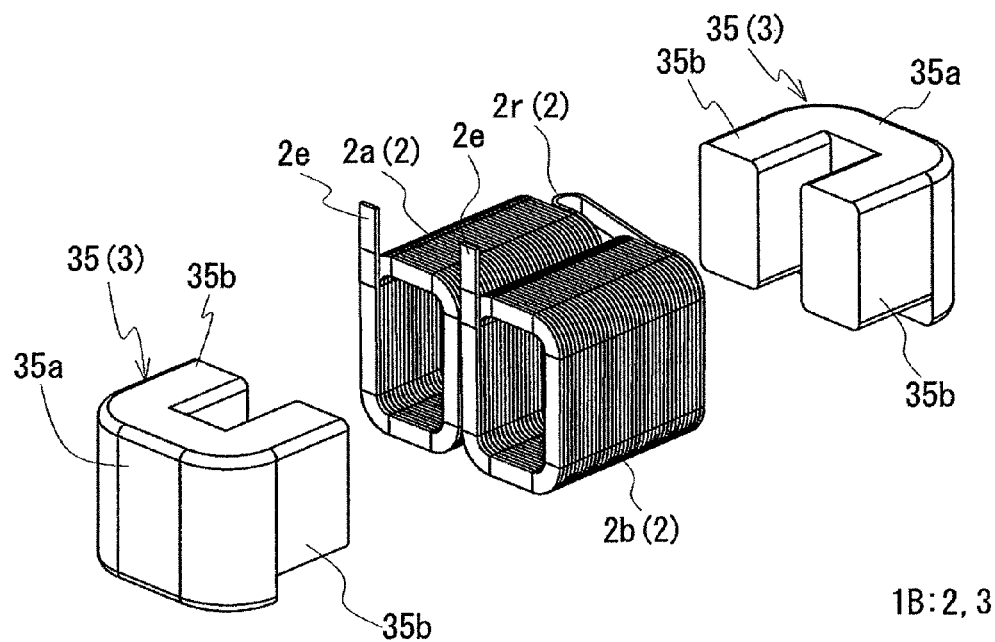
FIG. 3 is an exploded perspective view showing a reactor according to a second embodiment.

In a second embodiment, a reactor having a dividing shape for a magnetic core which is different from the first embodiment will be described with reference to FIG. 3. Since a coil 2 provided in a reactor 1B of FIG. 3 has completely the same structure as that of the coil 2 according to the first embodiment, description thereof will be omitted. Moreover, an external appearance of the reactor 1B according to the second embodiment is completely the same as that of the reactor 1A shown in FIGS. 1(A) and 1(B). The following description will be mainly given to a difference from the first embodiment.

[Magnetic Core]

A magnetic core 3 is configured by combining two divided core pieces 35 and 35 taking the same shape. More specifically, the divided core piece 35 takes an almost U shape seen from above and includes a base portion 35a and a pair of protruded portions 35b and 35b extended from the base portion 35a toward the coil 2.

The base portion 35a corresponds to the outer core 32 (see FIG. 2) of the first embodiment. Although an upper surface of the base portion 35a is flush with upper surfaces of the protruded portions 35b and 35b, a lower surface of the base portion 35a is lower than lower surfaces of the protruded portions 35b and 35b. For this reason, when the divided core pieces 35 and 35 are assembled into the coil 2, the lower surface of the base portion 35a of the divided core piece 35 is flush with the lower surface of the coil 2.

The protruded portions 35b and 35b have lengths which are an almost half of lengths of coil elements 2a and 2b respectively. For this reason, when the two divided core pieces 35 and 35 are inserted into the coil elements 2a and 2b at both end sides of the coil elements 2a and 2b respectively, a portion corresponding to the inner core 31 (see FIG. 2) according to the first embodiment is formed by the protruded portion 35b in one of the divided core pieces 35 and the protruded portion 35b in the other divided core piece 35.

In the reactor 1B, the magnetic core 3 is configured by the two divided core pieces 35 and 35. For this reason, the number of components is smaller as compared with the magnetic core 3 according to the first embodiment. Moreover, there are two bonding places of the divided core pieces 35 and 35, that is, mutual opposite surfaces of the pair of protruded portions 35b and 35b in one of the divided core piece 35 and the pair of protruded portions 35b and 35b in the other divided core piece 35. For this reason, the magnetic core 3 can be constructed more easily than the magnetic core 3 of the reactor 1A according to the first embodiment. Therefore, the reactor 1B according to the second embodiment has high productivity.

The magnetic core can also be configured by combining two divided core pieces having an almost L shape seen from above. More specifically, each of the divided core pieces includes a member corresponding to an outer core and a member corresponding to an inner core to be inserted into one of the coil elements. Also in this case, there are two bonding places of the divided core pieces. In the same manner as the reactor 1B, therefore, the magnetic core can be constructed more easily as compared with the reactor 1A according to the first embodiment.

Third Embodiment

The reactors according to the first and second embodiments may be used for a component of a converter mounted on a vehicle or the like, or a component of a power conversion device including the converter, for example.

Figure 4:
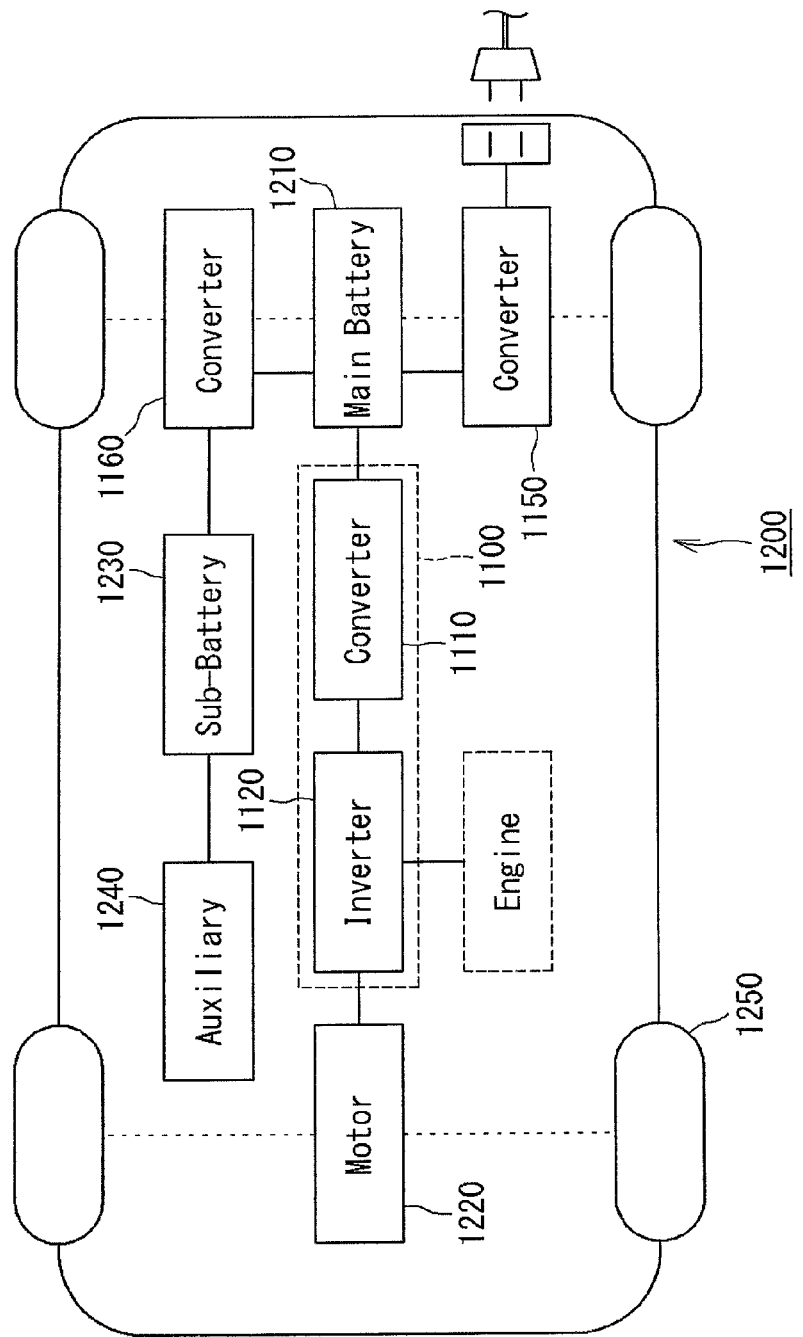
FIG. 4 is a brief configuration diagram schematically showing a power supply system of a hybrid electric vehicle.

For example, as shown in FIG. 4, a vehicle 1200, which is a hybrid electric vehicle or an electric vehicle, includes a main battery 1210, a power conversion device 1100 connected to the main battery 1210, and a motor (a load) 1220 driven by a power fed from the main battery 1210 and used for traveling. The motor 1220 is typically a three-phase alternating current motor. The motor 1220 drives wheels 1250 during traveling and functions as a generator during regeneration. In the case of a hybrid electric vehicle, the vehicle 1200 includes an engine in addition to the motor 1220. FIG. 4 illustrates an inlet as a charging portion of the vehicle 1200. However, a plug may be included.

The power conversion device 1100 includes a converter 1110 connected to the main battery 1210, and an inverter 1120 that is connected to the converter 1110 and performs conversion between direct current and alternating current. During traveling of the vehicle 1200, the converter 1110 steps up a direct-current voltage (input voltage) of the main battery 1210, which is in a range from 200 to 300 V, to a level in a range from about 400 to 700 V, and then feeds the power to the inverter 1120. Also, during regeneration, the converter 1110 steps down the direct-current voltage (the input voltage) from the motor 1220 through the inverter 1120 to a direct-current voltage suitable for the main battery 1210, and then uses the direct-current voltage for the charge of the main battery 1210. During traveling of the vehicle 1200, the inverter 1120 converts the direct current stepped up by the converter 1110 into predetermined alternating current and feeds the alternating current to the motor 1220. During regeneration, the inverter 1120 converts the alternating current output from the motor 1220 into direct current and outputs the direct current to the converter 1110.

Figure 5:
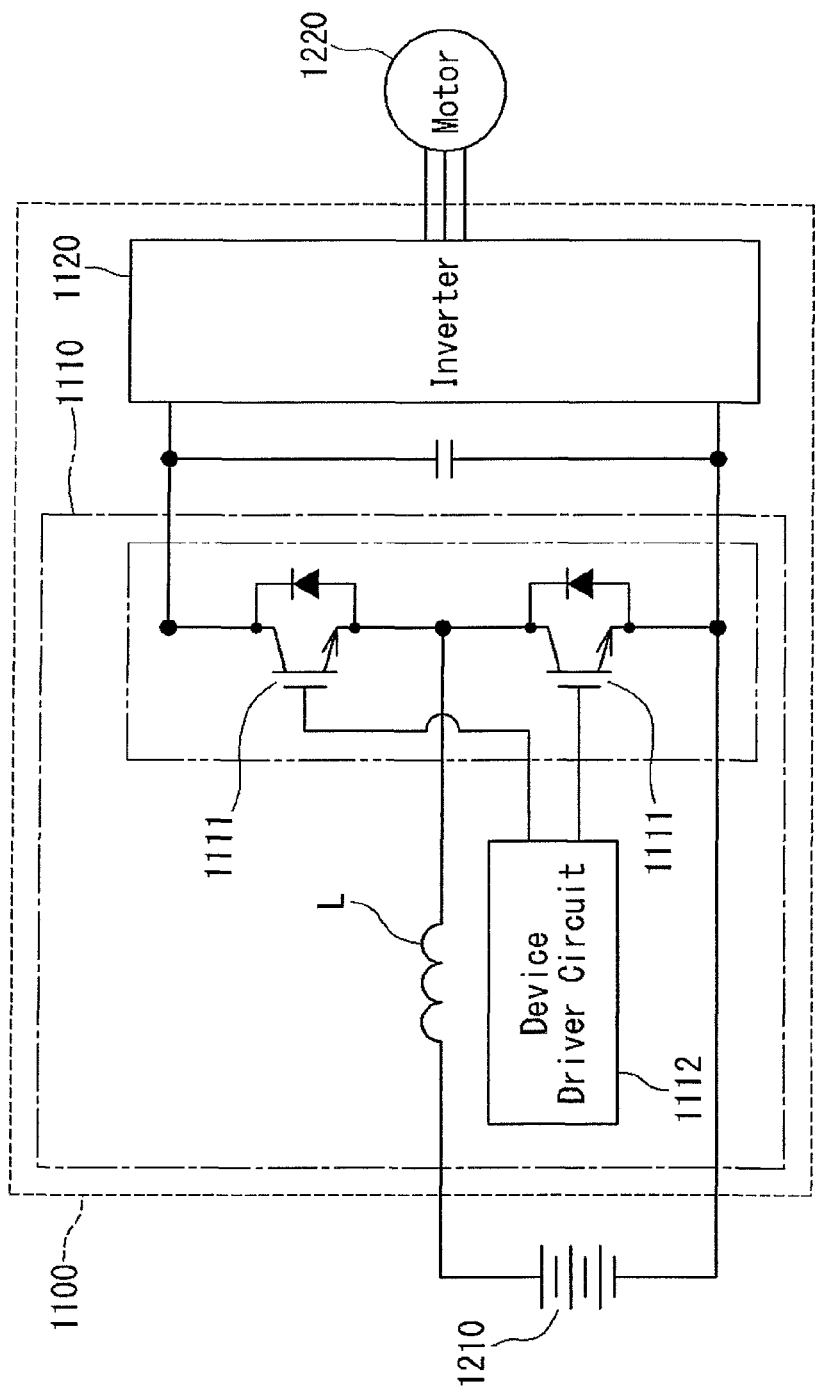
FIG. 5 is a brief circuit diagram showing an example of a power conversion device according to embodiments of the present invention including a converter according to the embodiments of the present invention.

As shown in FIG. 5, the converter 1110 includes a plurality of switching elements 1111, a driving circuit 1112 that controls operations of the switching elements 1111, and a reactor L. The converter 1110 converts the input voltage (in this situation, performs step up and down) by repetition of ON/OFF operations (switching operations). The switching elements 1111 each use a power device such as an FET or an IGBT. The reactor L uses a characteristic of a coil that disturbs a change in a current trying to flow through a circuit, and has a function of making the change smooth when the current is increased or decreased by the switching operation. The reactor described in each of the first and second embodiments is used for the reactor L. By using a small-sized reactor, it is also possible to reduce a size of the power conversion device 1100 (including the converter 1110).

The vehicle 1200 includes, in addition to the converter 1110, a feeding device converter 1150 connected to the main battery 1210, and an auxiliary power supply converter 1160 that is connected to a sub-battery 1230 serving as a power source of an auxiliary 1240 and the main battery 1210 and that converts a high voltage of the main battery 1210 to a low voltage. The converter 1110 typically performs DC-DC conversion, whereas the feeding device converter 1150 and the auxiliary power supply converter 1160 perform AC-DC conversion. The feeding device converter 1150 may include a kind that performs DC-DC conversion. The feeding device converter 1150 and the auxiliary power supply converter 1160 each may include a configuration similar to the reactor according to any of the above-described embodiments, and the size and shape of the reactor may be properly changed. Also, the reactor according to each of the first and second embodiments may be used for a converter that performs conversion for the input power and that performs only stepping up or stepping down.

The present invention is not limited to the above-described embodiments but may be properly modified without departing from the scope of the invention.

INDUSTRIAL APPLICABILITY

The reactor according to the present invention can be used for a component of a power conversion device, for example, a DC-DC converter mounted on a vehicle such as a hybrid electric vehicle, a plug-in hybrid electric vehicle, an electric vehicle or a fuel cell vehicle or a converter of an air conditioner. Parts for the reactor according to the present invention can be used for the components of the reactor used in the power conversion device.

REFERENCE SIGNS LIST 1A, 1B: REACTOR
2: COIL
2a, 2b: COIL ELEMENT
2r: COIL ELEMENT COUPLING PORTION
2e: END
3: MAGNETIC CORE
31: DIVIDED CORE PIECE (INNER CORE)
32: DIVIDED CORE PIECE (OUTER CORE)
35: DIVIDED CORE PIECE
35a: BASE PORTION (OUTER CORE)
35b: PROTRUDED PORTION (INNER CORE)
1100: POWER CONVERSION DEVICE
1110: CONVERTER
1111: SWITCHING ELEMENT
1112: DRIVING CIRCUIT
L: REACTOR
1120: INVERTER
1150: FEEDING DEVICE CONVERTER
1160: AUXILIARY POWER SUPPLY CONVERTER
1200: VEHICLE
1210: MAIN BATTERY
1220: MOTOR
1230: SUB-BATTERY
1240: AUXILIARY
1250: WHEEL

The invention claimed is:

1. A reactor comprising:
a coil formed by connecting a pair of coil elements configured by a wound wire; and
a magnetic core, wherein
the reactor is configured to be used for an on-vehicle converter that converts an input voltage, electricity applying conditions including a maximum DC current of 100 A or higher and 1000 A or smaller, an average voltage of 100 V or higher and 1000 V or smaller, and a usable frequency of 5 kHz or higher and 100 kHz or smaller,
the magnetic core is obtained by combining a plurality of divided core pieces with an unavoidable clearance or an adhesive therebetween, all of the divided core pieces being made of a hardened compact obtained by hardening a resin of a composite material containing magnetic powder and the resin;
the unavoidable clearance or the adhesive suppresses a change in the relative magnetic permeability of the whole magnetic core so that the change is 5% or lower as compared to a case where the unavoidable clearance or the adhesive is not present; and
a distance between an inner peripheral surface of the coil element and an outer peripheral surface of the magnetic core which is opposite to the inner peripheral surface is 0.1 mm or more and 2 mm or less.

2. The reactor according to claim 1, further comprising an insulating member for insulating the inner peripheral surface of the coil element from the outer peripheral surface of the magnetic core which is opposite to the inner peripheral surface.

3. A converter comprising the reactor according to claim 1.

4. A power conversion device comprising the converter according to claim 3.

5. A converter comprising the reactor according to claim 2.

6. A power conversion device comprising the converter according to claim 5.

* * * * *